United States Patent
Oba et al.

(10) Patent No.: US 8,020,375 B2
(45) Date of Patent: Sep. 20, 2011

(54) EXHAUST GAS PURIFICATION SYSTEM FOR INTERNAL COMBUSTION ENGINE

(75) Inventors: Takahiro Oba, Susono (JP); Katsushi Takimoto, Susono (JP); Akihiko Negami, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 484 days.

(21) Appl. No.: 12/308,890

(22) PCT Filed: Jul. 20, 2007

(86) PCT No.: PCT/JP2007/064720
§ 371 (c)(1),
(2), (4) Date: Dec. 29, 2008

(87) PCT Pub. No.: WO2008/010612
PCT Pub. Date: Jan. 24, 2008

(65) Prior Publication Data
US 2009/0188237 A1 Jul. 30, 2009

(30) Foreign Application Priority Data
Jul. 21, 2006 (JP) .................................. 2006-199069

(51) Int. Cl.
*F01N 3/00* (2006.01)
(52) U.S. Cl. ................. 60/286; 60/285; 60/299; 60/303
(58) Field of Classification Search .................... 60/285, 60/286, 295, 299, 301, 303
See application file for complete search history.

(56) References Cited

U.S. PATENT DOCUMENTS

| | | | | |
|---|---|---|---|---|
| 6,240,724 B1 * | 6/2001 | Kudou et al. | .................. | 60/284 |
| 7,254,941 B2 * | 8/2007 | Okugawa et al. | ............... | 60/297 |
| 7,395,660 B2 * | 7/2008 | Kogo et al. | ..................... | 60/295 |
| 7,640,727 B2 * | 1/2010 | Kitahara | ......................... | 60/285 |
| 7,849,672 B2 * | 12/2010 | Shibata et al. | .................. | 60/277 |
| 2007/0163242 A1 | 7/2007 | Matsuoka et al. | | |

FOREIGN PATENT DOCUMENTS

| | | |
|---|---|---|
| EP | 1 512 849 A2 | 3/2005 |
| EP | 1 515 017 A2 | 3/2005 |
| EP | 1 600 612 A1 | 11/2005 |
| JP | A-2003-097254 | 4/2003 |
| WO | WO 2005/088109 A1 | 9/2005 |

* cited by examiner

*Primary Examiner* — Binh Q. Tran
(74) *Attorney, Agent, or Firm* — Oliff & Berridge, PLC

(57) ABSTRACT

An object of the present invention is to recover the performance of an exhaust gas purification apparatus while suppressing slipping of fuel through the exhaust gas purification apparatus. When the performance of the exhaust gas purification apparatus is to be recovered at a time when the intake air quantity of the internal combustion engine is increasing (S101, S103), an upper limit value is set for the quantity of fuel added through a fuel addition valve provided in the exhaust passage (S104). If a target fuel supply quantity to be supplied to the exhaust gas purification apparatus is larger than the upper limit value (S105), a quantity of fuel quantity equal to the upper limit value is added through the fuel addition valve, and the shortfall of fuel supply is injected by sub fuel injection in the internal combustion engine (S110, S111, S112).

4 Claims, 3 Drawing Sheets

EXHAUST GAS PURIFICATION SYSTEM FOR INTERNAL COMBUSTION ENGINE

This application is the national phase application under 35 U.S.C. §371 of PCT International Application No. PCT/JP2007/064720 filed on 20 Jul. 2007, which claims priority of Japanese Patent Application No. 2006-199069 filed on 21 Jul. 2008, the contents of which are incorporated herein by reference.

TECHNICAL FIELD

The present invention relates to an exhaust gas purification system for an internal combustion engine equipped with an exhaust gas purification apparatus provided in an exhaust passage of the internal combustion engine.

PRIOR ART

As exhaust gas purification systems for an internal combustion engine, systems equipped with an exhaust gas purification apparatus such as an NOx storage reduction catalyst (which will be simply referred to as an NOx catalyst, hereinafter) or a particulate filter on which an NOx catalyst is supported have been known. In the exhaust gas purification system for an internal combustion engine equipped with such an exhaust gas purification apparatus, in order to recover the performance of the exhaust gas purification apparatus, fuel is sometimes supplied to the exhaust gas purification apparatus to thereby raise the temperature of the exhaust gas purification apparatus and/or reduce the air-fuel ratio of the exhaust gas flowing into the exhaust gas purification apparatus.

Japanese Patent Application Laid-Open No. 2003-97254 discloses a technique of raising the temperature of the exhaust gas by performing sub fuel injection in the internal combustion engine at a time after main fuel injection in the internal combustion engine at which the fuel injected is burned to thereby activate the NOx catalyst and a technique of supplying fuel to the activated NOx catalyst by adding fuel into the exhaust gas through a fuel addition valve provided in the exhaust passage upstream of the NOx catalyst to thereby reduce nitrogen oxides (NOx) stored in the NOx catalyst.

DISCLOSURE OF THE INVENTION

When an internal combustion engine is in an operating state in which the intake air quantity is increasing, such as when accelerating a vehicle, the flow rate of the exhaust gas also increases necessarily. If the flow rate of the exhaust gas is increasing when fuel is added into the exhaust gas through a fuel addition valve in order to recover the performance of an exhaust gas purification apparatus, the fuel added through the fuel addition valve is likely to slip through the exhaust gas purification apparatus. That is, the fuel added is likely to flow to the downstream of the exhaust gas purification apparatus without being used in the chemical reaction for recovering the performance of the exhaust gas purification apparatus. Consequently, there is a possibility that the quantity of fuel emitted to the exterior increases and the fuel economy is deteriorated.

The present invention has been made in view of the above described problem and has as an object to provide a technique that enables to recover the performance of an exhaust gas purification apparatus while suppressing slipping of fuel through the exhaust gas purification apparatus.

According to the present invention, an exhaust gas purification apparatus and a fuel addition valve are provided in an exhaust passage. In addition, when the performance of the exhaust gas purification apparatus is to be recovered at a time when the intake air quantity of the internal combustion engine is increasing, an upper limit value is set for the quantity of fuel added through the fuel addition valve, and if the target fuel supply quantity, or the quantity of fuel to be supplied to the exhaust gas purification apparatus is larger than that upper limit value, a quantity of fuel equal to the upper limit value is added through the fuel addition valve, and a quantity of fuel equal to the shortfall of fuel supply is injected by sub fuel injection in the internal combustion engine.

More specifically, the exhaust gas purification system for an internal combustion engine according to the present invention comprises:

an exhaust gas purification apparatus provided in an exhaust passage of an internal combustion engine and including a catalyst having an oxidizing function;

a fuel injection valve that injects fuel directly into a cylinder of said internal combustion engine;

a fuel addition valve that adds fuel into exhaust gas, said fuel addition valve being provided in said exhaust passage upstream of said exhaust gas purification apparatus;

target fuel supply quantity calculation unit for calculating a target fuel supply quantity defined as the quantity of fuel that is required to be supplied to said exhaust gas purification apparatus to recover performance of said exhaust gas purification apparatus;

upper limit value setting unit for setting an upper limit value of the fuel addition quantity in a case where fuel addition by said fuel addition valve is performed at a time when the intake air quantity of said internal combustion engine is increasing, wherein in a case where the performance of said exhaust gas purification apparatus is to be recovered at a time when the intake air quantity of said internal combustion engine is increasing, if the target fuel supply quantity calculated by said target fuel supply quantity calculation unit is larger than the upper limit value set by said upper limit value setting unit, a quantity of fuel equal to said upper limit value is added by said fuel addition valve, and a quantity of fuel equal to the shortfall of fuel supply is injected by performing sub fuel injection by said fuel injection valve at a time after main fuel injection and at which injected fuel is discharged from said cylinder.

Here, the upper limit value of the fuel addition quantity is such a value that when fuel addition by the fuel addition valve is performed, the quantity of fuel slipping through the exhaust gas purification apparatus falls within an allowable range.

The fuel injected through the fuel injection valve has smaller particle diameters than the fuel added through the fuel addition valve. Accordingly, the fuel injected by sub fuel injection is likely to be used in the chemical reaction for recovering the performance of the exhaust gas purification apparatus and unlikely to slip through the exhaust gas purification apparatus.

In view of the above, according to the present invention, if the target fuel supply quantity is larger than the upper limit value of the fuel addition quantity when the performance of the exhaust gas purification apparatus is to be recovered, a quantity of fuel equal to the upper limit value is added through the fuel addition valve. In addition, a quantity of fuel equal to the shortfall of the fuel supply is injected by sub fuel injection in the internal combustion engine. Thus, the total quantity of fuel supplied to the exhaust gas purification apparatus becomes equal to the target fuel supply quantity.

With the above feature, even in a case where the performance of the exhaust gas purification apparatus is to be recovered when the intake air quantity of the internal combustion engine is increasing, it is possible to supply a quantity of fuel equal to the target fuel supply quantity to the exhaust gas purification apparatus while suppressing slipping of fuel through the exhaust gas purification apparatus. Thus, according to the present invention, recovery of the performance of the exhaust gas purification apparatus can be achieved while suppressing slipping of fuel through the exhaust gas purification apparatus.

In the system according to the present invention, the lower the temperature of said exhaust gas purification apparatus is, and/or the larger the increase in the intake air quantity of said internal combustion engine per unit time is, the smaller the upper limit value setting unit may set the upper limit value of the fuel addition quantity.

The lower the temperature of the exhaust gas purification apparatus is, the less likely the fuel supplied to the exhaust gas purification apparatus is to be used in the chemical reaction for recovering the performance of the exhaust gas purification apparatus, and the more likely the fuel is to slip through the exhaust gas purification apparatus accordingly. Furthermore, the larger the increase in the intake air quantity of the internal combustion engine per unit time is, the larger the increase in the flow rate of the exhaust gas per unit time is necessarily. The larger the increase in the flow rate of the exhaust gas per unit time is, the more likely the fuel is to slip through the exhaust gas purification apparatus.

By setting the upper limit value of the fuel addition quantity as described above, better control of slipping of fuel through the exhaust gas purification apparatus can be achieved.

In the system according to the present invention, when a quantity of fuel equal to the shortfall of fuel supply is injected by performing sub fuel injection by the fuel injection valve, correction may be performed in such a way that the smaller the intake air quantity of the internal combustion engine is, the more the sub fuel injection quantity is increased.

As described before, the fuel injected through the fuel injection valve has smaller particle diameters than the fuel added through the fuel addition valve. Therefore, the fuel injected by sub fuel injection is more likely to diffuse in the exhaust gas than the fuel added through the fuel addition valve. If the fuel injected by sub fuel injection diffuses in the exhaust gas by the time when it reaches the exhaust gas purification apparatus, it is difficult to promote the chemical reaction for recovering the performance of the exhaust gas purification apparatus.

The smaller the intake air quantity is, or the smaller the flow rate of the exhaust gas is, the longer time it takes for the fuel injected by sub fuel injection to reach the exhaust gas purification apparatus. Accordingly, the fuel diffuses in the exhaust gas to a larger extent.

By correcting the sub fuel injection quantity in the above described manner, the chemical reaction for recovering the performance of the exhaust gas purification apparatus can be further promoted. Consequently, recovery of the performance of the exhaust gas purification apparatus can be further improved.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENT

In the following, a specific embodiment of the exhaust gas purification system for an internal combustion engine according to the present invention will be described with reference to the drawings.

Figure 1:
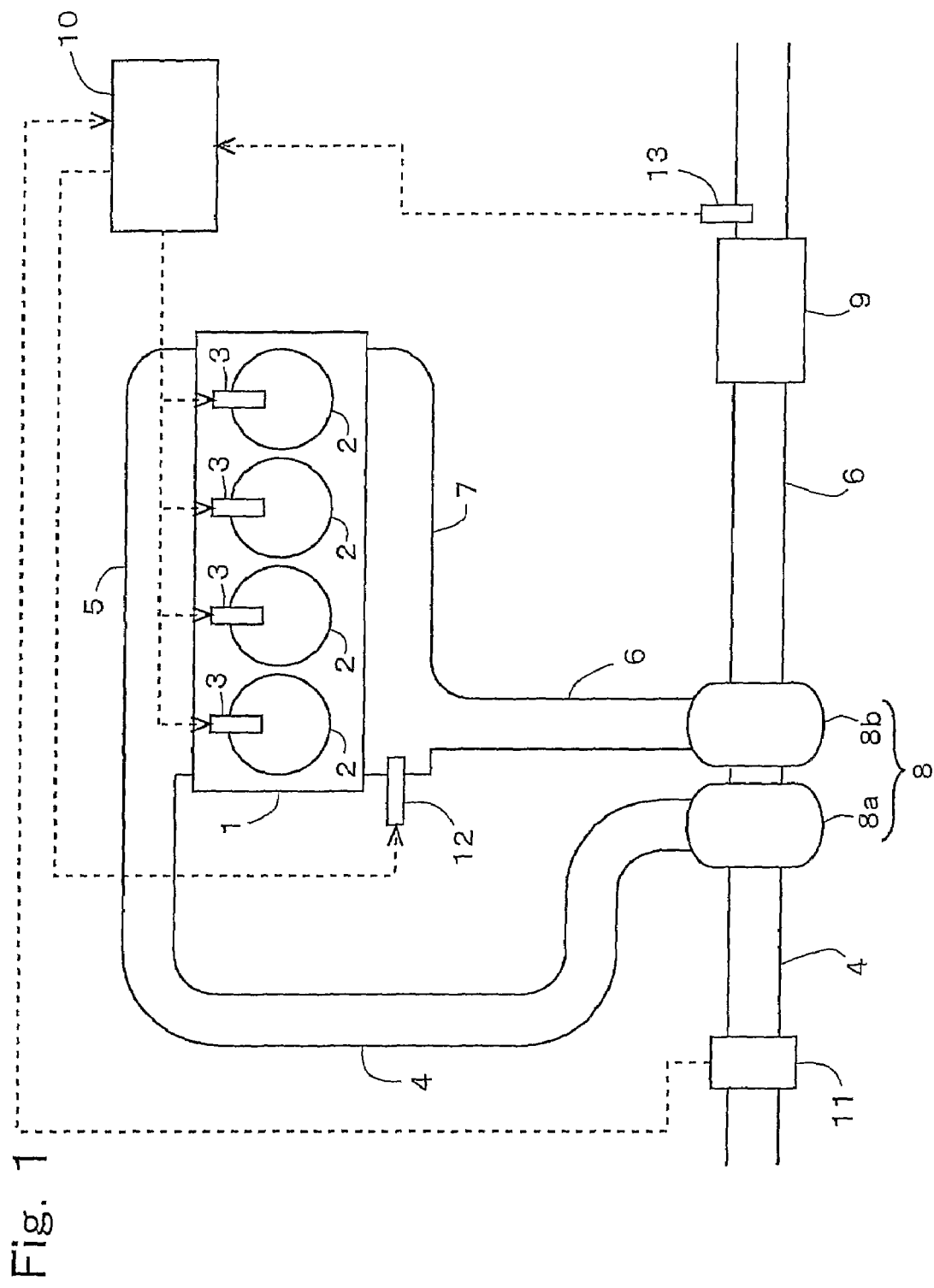
FIG. 1 is a diagram schematically showing the general structure of an internal combustion engine and its air-intake and exhaust systems according to an embodiment.

FIG. 1 is a diagram schematically showing the general structure of the internal combustion engine and its air-intake and exhaust systems according to an embodiment. The internal combustion engine 1 is a diesel engine having four cylinders 2 for driving a vehicle. Each cylinder 2 is provided with a fuel injection valve 3 that injects fuel directly into the cylinder 2.

To the internal combustion engine 1 is connected an intake manifold 5 and an exhaust manifold 7. One end of an intake passage 4 is connected to the intake manifold 5. One end of an exhaust passage 6 is connected to the exhaust manifold 7.

The intake passage 4 is provided with an air flow meter 11 and a compressor 8a of a turbocharger 8. The exhaust passage 6 is provided with a turbine 8b of the turbocharger 8.

The exhaust passage 6 is provided with an NOx catalyst 9 disposed downstream of the turbine 8b. In this embodiment, the NOx catalyst 9 constitutes the exhaust gas purification apparatus in the present invention. The exhaust passage 6 is provided with a temperature sensor 13 disposed downstream of the NOx catalyst 9. The temperature sensor 13 detects the temperature of the exhaust gas. The exhaust manifold 7 is provided with a fuel addition valve 12 that adds fuel into the exhaust gas.

To the internal combustion engine 1 is annexed an electronic control unit (ECU) 10 that controls the operating state of the internal combustion engine 1. The ECU 10 is electrically connected with the air flow meter 11 and the temperature sensor 13. The output signals of these sensors are input to the ECU 10. The ECU 10 estimates the temperature of the NOx catalyst 9 based on the detection value of the temperature sensor 13.

The ECU 10 is also electrically connected with the fuel injection valve 3 and the fuel addition valve 12. These valves are controlled by the ECU 10.

Figure 2:
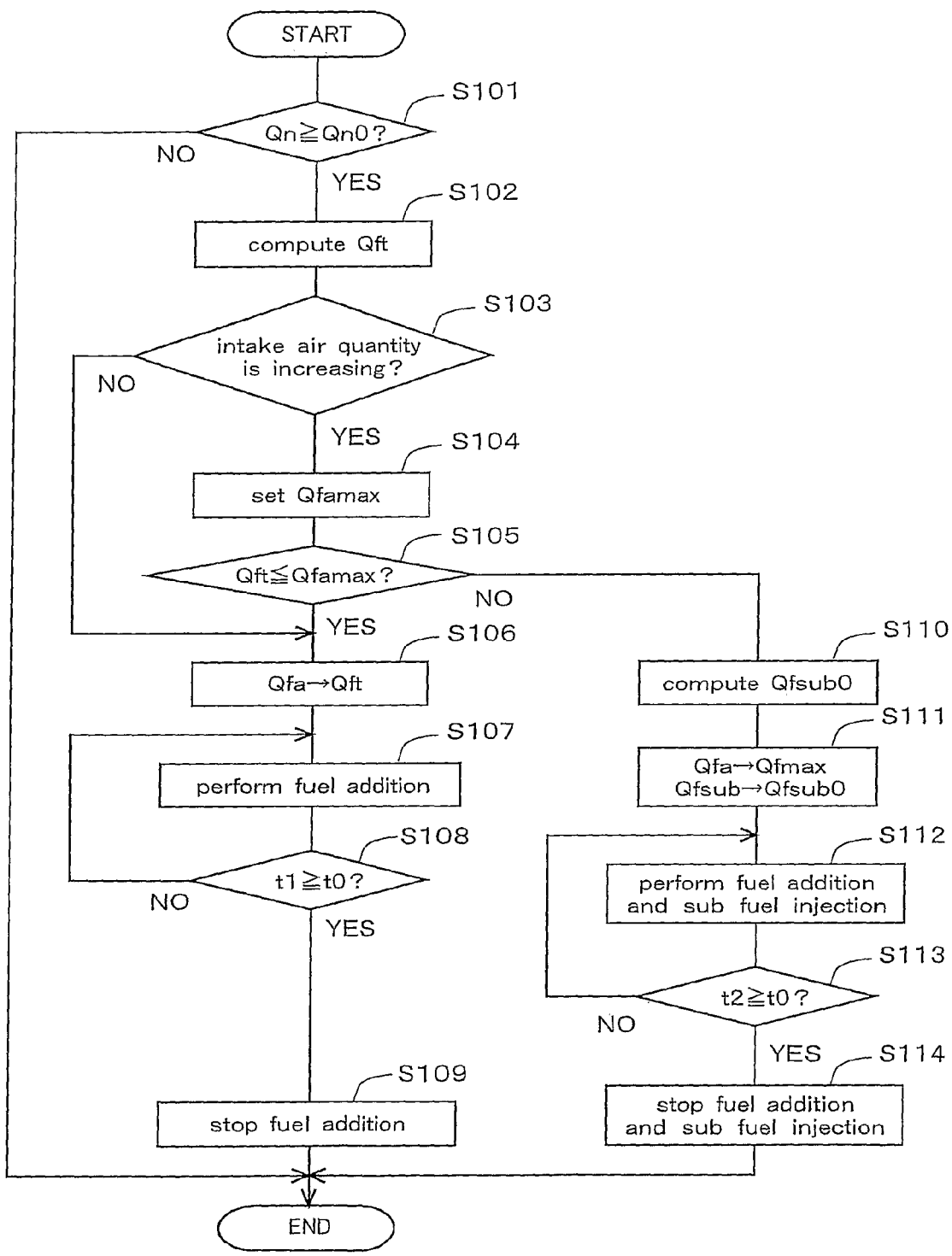
FIG. 2 is a flow chart of an NOx reduction control routine according to the embodiment.

In the following, an NOx reduction control routine executed to reduce NOx stored in the NOx catalyst 9 in this embodiment will be described with reference to a flow chart of FIG. 2. This routine is stored in the ECU 10 in advance and executed repeatedly at predetermined intervals while the internal combustion engine 1 is running.

In this routine, first in step S101, the ECU 10 determines whether or not the quantity Qn of NOx stored in the NOx catalyst 9 is larger than or equal to a specific storage quantity Qn0. Here, the specific storage quantity Qn0 is a threshold value for starting execution of the NOx reduction control. The specific storage quantity Qn0 is determined in advance by, for example, experiments. If the determination in step S101 is affirmative, the process of the ECU 10 proceeds to step S102, and if the determination in step S101 is negative, the ECU 10 once terminates execution of this routine.

In step S102, the ECU 10 computes a target fuel supply quantity Qft as a target value of the quantity of fuel to be supplied to the NOx catalyst 9 based on the intake air quantity of the internal combustion engine 1 and the main fuel injection quantity, or the quantity of fuel injected through the fuel injection valve 3 in main injection. The target fuel supply quantity Qft is computed as a value that makes the air-fuel ratio of the exhaust gas flowing into the NOx catalyst 9 equal to a target rich air-fuel ratio that enables to reduce NOx stored in the NOx catalyst 9. The target rich air-fuel ratio is determined in advance by, for example, experiments.

Then, the process of the ECU 10 proceeds to step S103, where the ECU 10 determines whether or not the intake air quantity is increasing. If the determination in step S103 is affirmative, the process of the ECU 10 proceeds to step S104, and if the determination in step S103 is negative, the process of the ECU 10 proceeds to step S106.

In step S104, the ECU 10 sets an upper limit value Qfamax of the quantity of fuel added by the fuel addition valve 12 based on the temperature of the NOx catalyst 9 and the increase in the intake air quantity per unit time. When the intake air quantity is increasing, the flow rate of the exhaust gas is also increasing, and therefore the fuel added through the fuel addition valve 12 is likely to slip through the NOx catalyst 9. The upper limit value Qfamax of the fuel addition quantity is determined in such a way that when fuel is added through the fuel addition valve 12 by that quantity, the quantity of fuel slipping through the NOx catalyst 9 will become the upper limit value of the allowable range.

The relationship of the upper limit value Qfamax of the fuel addition quantity to the temperature of the NOx catalyst 9 and the increase in the intake air quantity per unit time is obtained in advance by, for example, experiments and stored as a map in the ECU 10. In this map, the lower the temperature of the NOx catalyst 9 is, and the larger the increase in the intake air quantity per unit time is, the smaller the upper limit value Qfamax of the fuel addition quantity is.

Then, the process of the ECU 10 proceeds to step S105, where the ECU 10 determines whether or not the target fuel supply quantity Qft is smaller than or equal to the upper limit value Qfamax of the fuel addition quantity. If the determination in step S105 is affirmative, the process of the ECU 10 proceeds to step S106, and if the determination in step S105 is negative, the process of the ECU 10 proceeds to step S110.

In step S106, the ECU 10 sets the quantity Qfa of fuel to be added by the fuel addition valve 12 to the target fuel supply quantity Qft.

Then, the process of the ECU 10 proceeds to step S107, where fuel addition by the fuel addition valve 12 is executed.

Then, the process of the ECU 10 proceeds to step S108, where a determination is made as to whether or not the elapsed time t1 since the start of fuel addition by the fuel addition valve 12 has become equal to or longer than a specific time t0. Here, the specific time to is such a time that after it has elapsed, it can be considered that NOx stored in the NOx catalyst 9 has been reduced sufficiently. The specific time to is determined in advance by, for example, experiments. If the determination in step S108 is affirmative, the process of the ECU 10 proceeds to step S109, and if the determination in step S108 is negative, the process of the ECU 10 returns to step S107.

In step S109, the ECU 10 stops fuel addition by the fuel addition valve 12. After that, the ECU 10 once terminates execution of this routine.

On the other hand, in step S110, the ECU 10 computes a reference sub fuel injection quantity Qfsub0 by subtracting the upper limit value Qfamax of the fuel addition quantity from the target fuel supply quantity Qft. The reference sub fuel injection quantity Qfsub0 is the reference value of the quantity of fuel injected in sub injection (sub fuel injection quantity) performed by the fuel injection valve 3 at a time after main fuel injection and at which fuel injected is discharged from the cylinder 2.

Then, the process of the ECU 10 proceeds to step S111, where the ECU 10 sets the quantity Qfa of fuel to be added through the fuel addition valve 12 to the upper limit value Qfamax and sets the sub fuel injection quantity Qfsub to the reference sub fuel injection quantity Qfsub0.

Then, the process of the ECU 10 proceeds to step S112, where fuel addition by the fuel addition valve 12 and sub fuel injection by the fuel injection valve 3 are executed.

Then, the process of the ECU 10 proceeds to step S113, where a determination is made as to whether or not the elapsed time t2 since the start of fuel addition by the fuel addition valve 12 and sub fuel injection by the fuel injection valve 3 has become equal to or longer than the specific time t0. Here, the specific time t0 is the same as the specific time to in step S108. If the determination in step S113 is affirmative, the process of the ECU 10 proceeds to step S114, and if the determination in step S113 is negative, the process of the ECU 10 returns to step S112.

In step S114, the ECU 10 causes the fuel addition valve 12 to stop fuel addition and causes the fuel injection valve 3 to stop sub fuel injection. After that, the ECU 10 once terminates execution of this routine.

According to the above described routine, in cases where the NOx reduction control is to be executed at a time when the intake air quantity of the internal combustion engine 1 is increasing, the upper limit value Qfamax is set for the quantity Qfa of fuel added by the fuel addition valve 12. If the target fuel supply quantity Qft is larger than that upper limit value Qfamax, the fuel addition by the fuel addition valve 12 is executed with the fuel addition quantity Qfa being controlled to the upper limit value Qfamax. In addition a quantity of fuel equal to the shortfall of fuel supply is injected by sub fuel injection. Thus, the total quantity of fuel supplied to the NOx catalyst 9 is controlled to be equal to the target fuel supply quantity Qft.

The fuel injected through the fuel injection valve 3 has smaller particle diameters as compared to the fuel added through the fuel addition valve 12. For this reason, the fuel injected by the sub fuel injection is likely to be used in the NOx reduction reaction in the NOx catalyst 9 and unlikely to slip through the NOx catalyst 9.

As per the above, according to the above described routine, even in cases where the NOx reduction control is executed at a time when the intake air quantity of the internal combustion engine 1 is increasing, supply of the target fuel supply quantity Qft to the NOx catalyst 9 can be achieved while suppressing slipping of fuel through the NOx catalyst 9. In other words, the air-fuel ratio of the exhaust gas flowing into the NOx catalyst 9 can be made equal to the target rich air-fuel ratio. Consequently, the NOx storage ability of the NOx catalyst 9 can be recovered by reducing NOx stored in the NOx catalyst 9 while suppressing slipping of fuel through the NOx catalyst 9.

When the NOx reduction control is executed, the lower the temperature of the NOx catalyst 9 is, the less likely the fuel supplied to the NOx catalyst 9 is to be used in the NOx reduction reaction, and the more likely the fuel is to slip through the NOx catalyst 9 accordingly. Furthermore, the larger the increase in the intake air quantity of the internal combustion engine 1 per unit time is, or the larger the increase in the flow rate of the exhaust gas per unit time is, the more likely the fuel supplied to the NOx catalyst 9 is to slip through the NOx catalyst 9.

In view of the above, in the above described routine, the lower the temperature of the NOx catalyst 9 is, and the larger the increase in the intake air quantity per unit time is, the smaller the upper limit value Qfamax of the fuel addition quantity is made. Thus, the proportion of the fuel added through the fuel addition valve 12 in the total quantity of fuel supplied to the NOx catalyst 9 becomes smaller. As a result, the slipping of fuel through the NOx catalyst can be further controlled.

<Modification>

Figure 3:
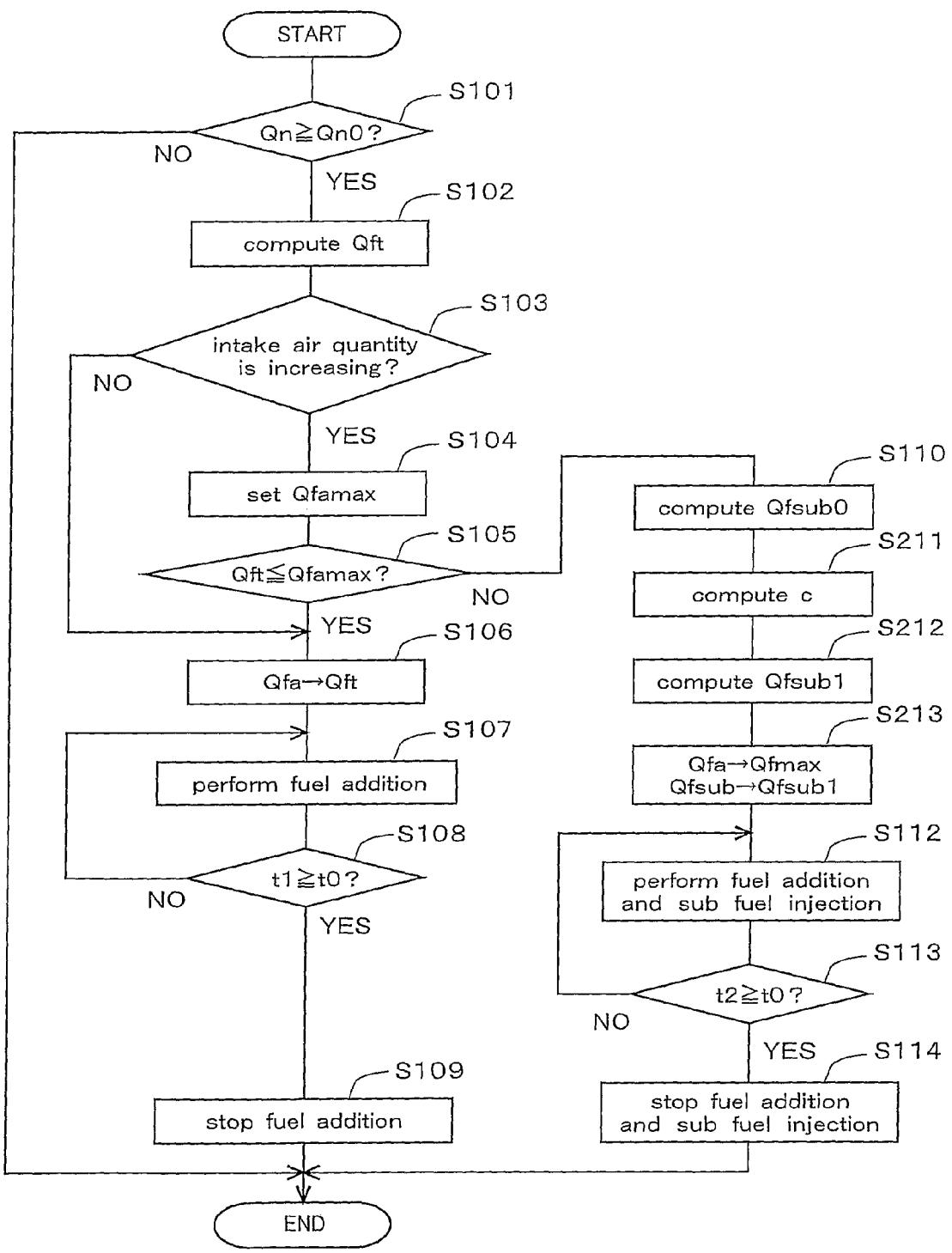
FIG. 3 is a flow chart of an NOx reduction control routine according to a modification of the embodiment.

In the following, a modification of the above described embodiment will be described with reference to FIG. 3. FIG. 3 is a flow chart of an NOx reduction control routine according to the modification. This routine is store in the ECU 10 in advance, and executed repeatedly at predetermined intervals while the internal combustion engine 1 is running. What is different in this routine from the routine shown in FIG. 2 is only that steps S211 and S212 have been added and step S111 has been replaced by step S213. Accordingly, processes that are equivalent to those in the routine shown in FIG. 2 will be denoted by like reference signs, and a description thereof will be omitted.

In this routine, after step S110, the process of the ECU 10 proceeds to step S211. In step S211, the ECU 10 computes a correction coefficient c for correcting the reference sub fuel injection quantity Qfsub0 based on the intake air quantity of the internal combustion engine 1. The relationship between the correction coefficient c and the intake air quantity is stored in the ECU 10 in advance as a map. In this map, the smaller the intake air quantity is, the larger the correction coefficient c is.

Then, the process of the ECU 10 proceeds to step S212, where the ECU 10 computes a corrected sub fuel injection quantity Qfsub1 by multiplying the reference sub fuel injection quantity Qfsub0 by the correction coefficient c. The smaller the intake air quantity is, the larger the corrected sub fuel injection quantity Qfsub1 is.

Then, the process of the ECU 10 proceeds to step S213, where the quantity Qfa of fuel to be added through the fuel addition valve 12 is set to the upper limit value Qfamax and the sub fuel injection quantity Qfsub is set to the corrected sub fuel injection quantity Qfsub1. After that, the process of the ECU 10 proceeds to step S112.

Since the fuel injected through the fuel injection valve 3 has smaller particle diameters than the fuel added through the fuel addition valve 12, the fuel injected by sub fuel injection is more likely to diffuse in the exhaust gas than the fuel added through the fuel addition valve 12. If the fuel injected by sub fuel injection diffuses in the exhaust gas by the time when it reaches the NOx catalyst 9, it is difficult to reduce the air-fuel ratio of the exhaust gas flowing into the NOx catalyst 9 down to the target rich air-fuel ratio. Accordingly, it is difficult to promote the NOx reduction reaction in the NOx catalyst 9.

The smaller the intake air quantity is, or the smaller the flow rate of the exhaust gas is, the longer time it takes for the fuel injected by sub fuel injection to reach the NOx catalyst 9. Accordingly, the fuel diffuses in the exhaust gas to a larger extent, and it becomes difficult to reduce the air-fuel ratio of the exhaust gas flowing into the NOx catalyst 9.

According to the above described routine, when sub fuel injection is performed in the NOx reduction control, the reference sub fuel injection quantity Qfsub0 is corrected in such a way that the smaller the intake air quantity is, the larger the sub fuel injection quantity Qfsub is. Even in cases where the fuel injected by sub fuel injection diffuses in the exhaust gas, the air-fuel ratio of the exhaust gas flowing into the NOx catalyst 9 is likely to be reduced to the target rich air-fuel ratio by increasing the sub fuel injection quantity Qfsub.

Thus, according to this modification, the NOx reduction reaction in the NOx catalyst 9 can be further promoted. Consequently, recovery of the NOx storage ability of the NOx catalyst 9 can be further improved.

In the above descried embodiment, the target fuel supply quantity Qft, the upper limit value Qfamax of the fuel supply quantity, the reference sub fuel injection quantity Qfsub0 and the corrected sub fuel injection quantity Qfsub1 are calculated as quantities for one combustion cycle of the internal combustion engine 1.

The process of controlling the fuel addition quantity and sub fuel injection quantity in the NOx reduction control according to the above described embodiment may be applied to so-called SOx poisoning elimination control for reducing SOx (sulfur oxides) stored in the NOx catalyst 9. In this case, even if the SOx poisoning elimination control is performed at a time when the intake air quantity of the internal combustion engine 1 is increasing, reduction of SOx stored in the NOx catalyst 9 can be achieved while suppressing slipping of fuel through the NOx catalyst 9. The NOx catalyst 9 in this embodiment may be replaced by a particulate filter on which an NOx catalyst is supported. In this case, the process of controlling the fuel addition quantity and sub fuel injection quantity in the NOx reduction control according to the above described embodiment may be applied to so-called filter regeneration control for oxidizing and removing particulate matter trapped on the particulate filter. In this case, even if the filter regeneration control is performed at a time when the intake air quantity of the internal combustion engine 1 is increasing, particulate matter trapped on the particulate filter can be oxidized and removed while suppressing slipping of fuel through the particulate filter. In this case, the catalyst supported on the particulate filter is not limited to an NOx catalyst but it may include any catalyst having an oxidizing function. A catalyst having an oxidizing function may be separately provided in the exhaust passage 6 upstream of the particulate filter and downstream of the fuel addition valve.

While the invention has been described in terms of preferred embodiments, those skilled in the art will recognize that the invention can be practiced with modifications within the spirit and scope of the appended claims.

INDUSTRIAL APPLICABILITY

According to the present invention, it is possible to recover the performance of an exhaust gas purification apparatus while suppressing slipping of fuel though the exhaust gas purification apparatus.

The invention claimed is:

1. An exhaust gas purification system for an internal combustion engine, comprising:
   an exhaust gas purification apparatus provided in an exhaust passage of an internal combustion engine and including a catalyst having an oxidizing function;
   a fuel injection valve that injects fuel directly into a cylinder of said internal combustion engine;
   a fuel addition valve that adds fuel into exhaust gas, said fuel addition valve being provided in said exhaust passage upstream of said exhaust gas purification apparatus;
   target fuel supply quantity calculation unit for calculating a target fuel supply quantity defined as the quantity of fuel that is required to be supplied to said exhaust gas purification apparatus to recover performance of said exhaust gas purification apparatus;

upper limit value setting unit for setting an upper limit value of the fuel addition quantity in a case where fuel addition by said fuel addition valve is performed at a time when the intake air quantity of said internal combustion engine is increasing, wherein in a case where the performance of said exhaust gas purification apparatus is to be recovered at a time when the intake air quantity of said internal combustion engine is increasing, if the target fuel supply quantity calculated by said target fuel supply quantity calculation unit is larger than the upper limit value set by said upper limit value setting unit, a quantity of fuel equal to said upper limit value is added by said fuel addition valve, and a quantity of fuel equal to the shortfall of fuel supply is injected by performing sub fuel injection by said fuel injection valve at a time after main fuel injection and at which injected fuel is discharged from said cylinder.

2. An exhaust gas purification system for an internal combustion engine according to claim 1, wherein the upper limit value is such a value that when fuel addition by said fuel addition valve is performed by the quantity of that upper limit value, the quantity of fuel slipping through said exhaust gas purification apparatus becomes equal to the upper limit value of an allowable range.

3. An exhaust gas purification system for an internal combustion engine according to claim 1, wherein the lower the temperature of said exhaust gas purification apparatus is, and/or the larger an increase in the intake air quantity of said internal combustion engine per unit time is, the smaller said upper limit value setting unit sets the upper limit value of the fuel addition quantity.

4. An exhaust gas purification system for an internal combustion engine according to claim 1, wherein when a quantity of fuel equal to the shortfall of fuel supply is injected by performing sub fuel injection by said fuel injection valve, correction is performed in such a way that the smaller the intake air quantity of said internal combustion engine is, the more the sub fuel injection quantity is increased.

* * * * *